United States Patent
Kim et al.

(10) Patent No.: US 9,372,374 B2
(45) Date of Patent: Jun. 21, 2016

(54) LIQUID CRYSTAL DISPLAY DEVICE WITH UNIT PIXEL HAVING RHOMBUS-LIKE PLATE PORTION

(71) Applicant: SAMSUNG DISPLAY CO., LTD., Yongin, Gyeonggi-Do (KR)

(72) Inventors: Bo Yeong Kim, Asan-Si (KR); Jae Won Kim, Asan-Si (KR); Hyung Jun Park, Seongnam-Si (KR); Dong-Hyun Yoo, Hwaseong-Si (KR); Seong Young Lee, Hwaseong-Si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 0 days.

(21) Appl. No.: 14/452,149

(22) Filed: Aug. 5, 2014

(65) Prior Publication Data

US 2015/0248042 A1 Sep. 3, 2015

(30) Foreign Application Priority Data

Mar. 3, 2014 (KR) .................. 10-2014-0025216

(51) Int. Cl.
  *G02F 1/1368* (2006.01)
  *G02F 1/1343* (2006.01)
  *G02F 1/1337* (2006.01)

(52) U.S. Cl.
  CPC .... *G02F 1/134336* (2013.01); *G02F 1/133707* (2013.01); *G02F 2001/134318* (2013.01); *G02F 2001/134345* (2013.01)

(58) Field of Classification Search
  CPC ............ G02F 1/133345; G02F 1/134309; G02F 1/133707; G02F 2001/134345
  USPC ........................ 349/129, 144–146
  See application file for complete search history.

(56) References Cited

U.S. PATENT DOCUMENTS

| | | | |
|---|---|---|---|
| 7,342,629 B2 | 3/2008 | Yoshida et al. | |
| 7,583,346 B2 | 9/2009 | Hsieh et al. | |
| 8,379,176 B2 | 2/2013 | Kim et al. | |
| 8,421,975 B2 | 4/2013 | Morishita et al. | |
| 2004/0041770 A1* | 3/2004 | Kubo et al. | 345/96 |
| 2005/0001964 A1* | 1/2005 | Kubo et al. | 349/129 |
| 2006/0197898 A1 | 9/2006 | Kurasawa | |
| 2011/0141414 A1 | 6/2011 | Furukawa et al. | |
| 2012/0033160 A1 | 2/2012 | Tashiro et al. | |
| 2012/0281173 A1* | 11/2012 | Kwon et al. | 349/123 |
| 2013/0169521 A1 | 7/2013 | Lee et al. | |
| 2013/0169903 A1 | 7/2013 | Xiao et al. | |
| 2014/0168582 A1* | 6/2014 | Chang et al. | 349/106 |
| 2014/0267994 A1* | 9/2014 | Ryu et al. | 349/141 |

(Continued)

FOREIGN PATENT DOCUMENTS

| | | |
|---|---|---|
| JP | 4076768 | 2/2008 |
| JP | 2010-128211 | 6/2010 |

(Continued)

*Primary Examiner* — Joseph L Williams
(74) *Attorney, Agent, or Firm* — F. Chau & Associates, LLC (57) ABSTRACT

A liquid crystal display includes a lower panel, an upper panel, and a liquid crystal layer disposed therebetween. The lower panel includes a pixel electrode including at least one unit pixel electrode. The upper panel includes a common electrode. The unit pixel electrode includes a rhombus-like plate portion, and a plurality of minute branch portions extending therefrom.

20 Claims, 10 Drawing Sheets

(56) References Cited

U.S. PATENT DOCUMENTS

2015/0116641 A1* 4/2015 Oh et al. .................. 349/106
2015/0205168 A1* 7/2015 Ryu et al. ................. 349/106

FOREIGN PATENT DOCUMENTS

| | | |
|---|---|---|
| JP | 2011085738 | 4/2011 |
| JP | 2011203650 | 10/2011 |

* cited by examiner

LIQUID CRYSTAL DISPLAY DEVICE WITH UNIT PIXEL HAVING RHOMBUS-LIKE PLATE PORTION

CROSS-REFERENCE TO RELATED APPLICATION

This application claims priority to and the benefit of Korean Patent Application No. 10-2014-0025216 filed in the Korean Intellectual Property Office on Mar. 3, 2014, the entire contents of which are herein incorporated by reference.

TECHNICAL FIELD

The present disclosure relates to a display device, and more particularly, to a liquid crystal display device.

DISCUSSION OF THE RELATED ART

A liquid crystal display (LCD) is a type of flat panel display (FPD). In liquid crystal displays (LCDs), an image is displayed by changing the transmittance of light though various regions. The transmittance of light is controlled by altering an alignment of liquid crystal molecules using an electric field which is created by applying different voltages to pixel and common electrodes.

Liquid crystal displays (LCDs) may be classified as a twisted nematic (TN) mode, a vertical alignment (VA) mode, a plane to line switching (PLS) mode, etc. Among the LCDs, the VA mode LCD is provided such that long axes of the liquid crystal molecules are aligned substantially perpendicular to upper and lower display panels when no electric field is generated. The VA mode LCD may feature a wide viewing angle by including a plurality of domains in one pixel. The domains may be differently inclined.

The plurality of domains may be embodied by forming various features, for example, cutouts and the like, in the pixel electrode and/or the common electrode. Then, a fringe field may be generated between edges of the cutouts and electrodes facing them. LCDs may utilize an initial alignment method in which the liquid crystal molecules are pretilted when no electric field is present. This pre-tilting may increase response speed while maintaining a wide viewing angle.

SUMMARY

Exemplary embodiments of the present invention provide a liquid crystal display with increased display quality.

Further, exemplary embodiments of the present invention provide a liquid crystal display having an electrode structure that is capable of increasing transmittance therethrough.

A liquid crystal display includes a lower panel, an upper panel and a liquid crystal layer disposed therebetween. The lower panel includes a pixel electrode having at least one unit pixel electrode. The upper panel includes a common electrode. The unit pixel electrode includes a rhombus-like plate portion, and a plurality of minute branch portions extending therefrom.

The rhombus-like plate portion may include at least one side that is outwardly bowed. The at least one outwardly bowed side may have an approximate center that coincides with an approximate center of a reference side that corresponds to the outwardly bowed side. The reference side may be an imaginary line depicting a side of a true rhombus.

The at least one outwardly bowed side may be closest to the reference side at the centers thereof and may be farther from the reference side at the ends thereof.

The minute branch portions may extend from an edge of the plate portion in a direction approximately perpendicular thereto. One point of the at least one edge of the plate portion may be distanced by about 2 μm or less from another point adjacent thereto and one minute branch portion of the plurality of minute branch portions may be disposed between the one point and the other point. The one point of the at least one edge of the plate portion may be distanced by about 1 to 2 μm from the adjacent other point.

The common electrode may include a domain dividing element corresponding to the unit pixel electrode. The domain dividing element may have a cross-shaped opening. The domain dividing element may have a rhombus-shaped opening. The domain dividing element may have an opening that is shaped like a cross superimposed with a rhombus. A center of the cross-shaped opening may coincide with that of the plate portion. The rhombus-shaped opening may be smaller than the plate portion. Each side of the rhombus-shaped opening may be parallel to an adjacent edge of the plate portion. At least one side of the rhombus-shaped opening may be distanced by about 19 μm or more from an adjacent edge of the plate portion.

Each pixel electrode may include a first subpixel electrode and a second subpixel electrode, and the first and second subpixel electrodes may respectively include the plurality of unit pixel electrodes. Each first subpixel electrode may include four of the unit pixel electrodes that are connected to each other, and each second subpixel electrode may include six of the unit pixel electrodes that are connected to each other.

A liquid crystal display device includes a common electrode. A pixel electrode is divided into a plurality of unit pixels. The pixel electrode and the common electrode generate an electric field therebetween. A liquid crystal layer is disposed within the influence of the electric field. Each of the plurality of unit pixels includes a plate portion and a plurality of branch portions extending from the plate portion. The plate portion has a rhombus-like shape with at least one outwardly bowed side.

The at least one outwardly bowed side may have an approximate center that coincides with an approximate center of a reference side that corresponds to the outwardly bowed side. The reference side is not an actual element but rather a line depicting a side of a true rhombus.

The at least one outwardly bowed side may be closest to the reference side at the centers thereof and may be farther from the reference side at the ends thereof.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF THE EMBODIMENTS

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc. may be exaggerated for clarity. Like reference numerals may designate like elements throughout the specification. It will be understood that when an element such as a layer, film, region, or substrate is referred to as being "on" another element, it can be directly on the other element or intervening elements may also be present.

A liquid crystal display according to an exemplary embodiment of the present invention will now be described in detail with reference to the accompanying drawings.

Figure 1:
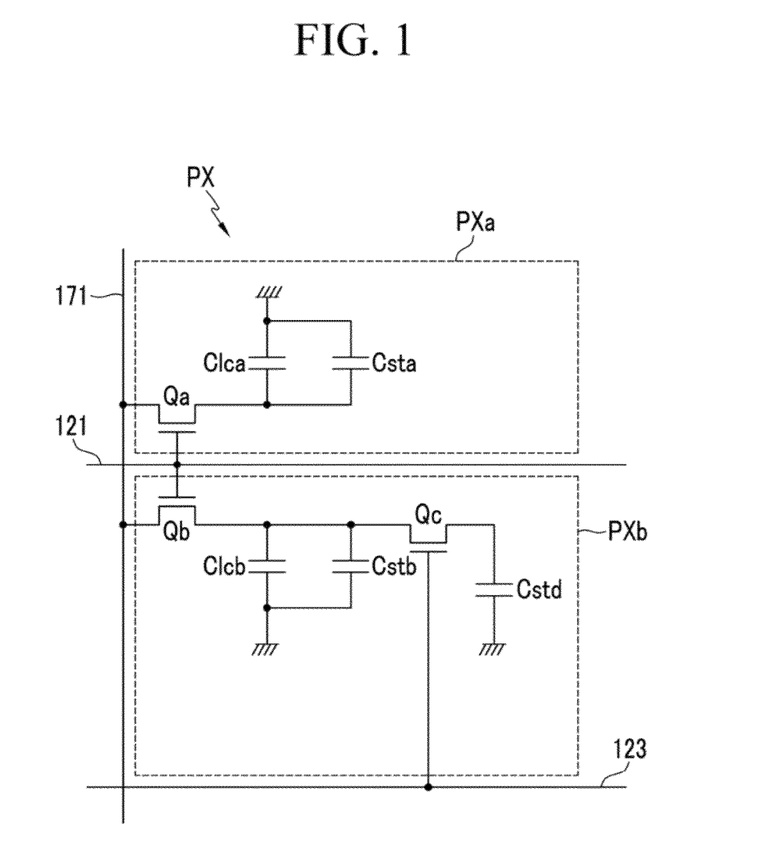
FIG. 1 is an equivalent circuit diagram of one pixel of a liquid crystal display according to an exemplary embodiment of the present invention.

FIG. 1 is an equivalent circuit diagram of one pixel of a liquid crystal display according to an exemplary embodiment of the present invention.

Referring to FIG. 1, a liquid crystal display according to an exemplary embodiment of the present invention includes a signal line including a gate line 121, a step-down gate line 123, and a data line 171, and a pixel PX connected to the signal line.

Each pixel PX includes a first subpixel PXa and a second subpixel PXb. The first subpixel PXa includes a first thin film transistor Qa, a first liquid crystal capacitor Clca, and a first storage capacitor Csta. The second subpixel PXb includes a second thin film transistors Qb, a third thin film transistor Qc, a second liquid crystal capacitor Clcb, a second storage capacitor Cstb, and a step-down capacitor Cstd.

The first and second thin film transistors Qa and Qb are each connected to the gate line 121 and the data line 171. The third thin film transistor Qc is connected to the step-down gate line 123. A control terminal of the first thin film transistor Qa is connected to the gate line 121, an input terminal of the first thin film transistor Qa is connected to the data line 171, and an output terminal of the first thin film transistor Qa is connected to the first liquid crystal capacitor Clca and the first storage capacitor Csta. A control terminal of the second thin film transistor Qb is connected to the gate line 121, an input terminal of the second thin film transistor Qb is connected to the data line 171, and an output terminal of the second thin film transistor Qb is connected to the second liquid crystal capacitor Clcb and the second storage capacitor Cstb. A control terminal of the third thin film transistor Qc is connected to the step-down gate line 123, an input terminal of the third thin film transistor Qc is connected to the second liquid crystal capacitor Clcb, and an output terminal of the third thin film transistor Qc is connected to the step-down capacitor Cstd. The step-down capacitor Cstd is connected to a common voltage together with the output terminal of the third thin film transistor Qc.

An operation of the pixel PX will now be described. First, when the gate line 121 is applied with a gate-on voltage Von, the first and second thin film transistors Qa and Qb connected thereto are turned on. Accordingly, a data voltage of the data line 171 is applied to the first and second liquid crystal capacitors Clca and Clcb through the first and second thin film transistors Qa and Qb, and the first and second liquid crystal capacitors Clca and Clcb are charged with a difference between the data voltage and the common voltage. In this case, the step-down gate line 123 may be applied with a gate-off voltage.

Next, when the gate-off voltage is applied to the gate line 121 and the gate-on voltage is applied to the step-down gate line 123, the first and second thin film transistors Qa and Qb are turned off, and the third thin film transistor Qc is turned on. A charging voltage of the second liquid crystal capacitor Clcb connected to the output terminal of the second thin film transistor Qb is accordingly dropped. Thus, in the case of the liquid crystal display driven by frame inversion, the charging voltage of the second liquid crystal capacitor Clcb is lower than that of the first liquid crystal capacitor Clca. As a result, it is possible to increase side visibility (e.g. viewing angle) of the liquid crystal display by differentiating the charging voltages of the first and second liquid crystal capacitors Clca and Clcb.

Figure 2:
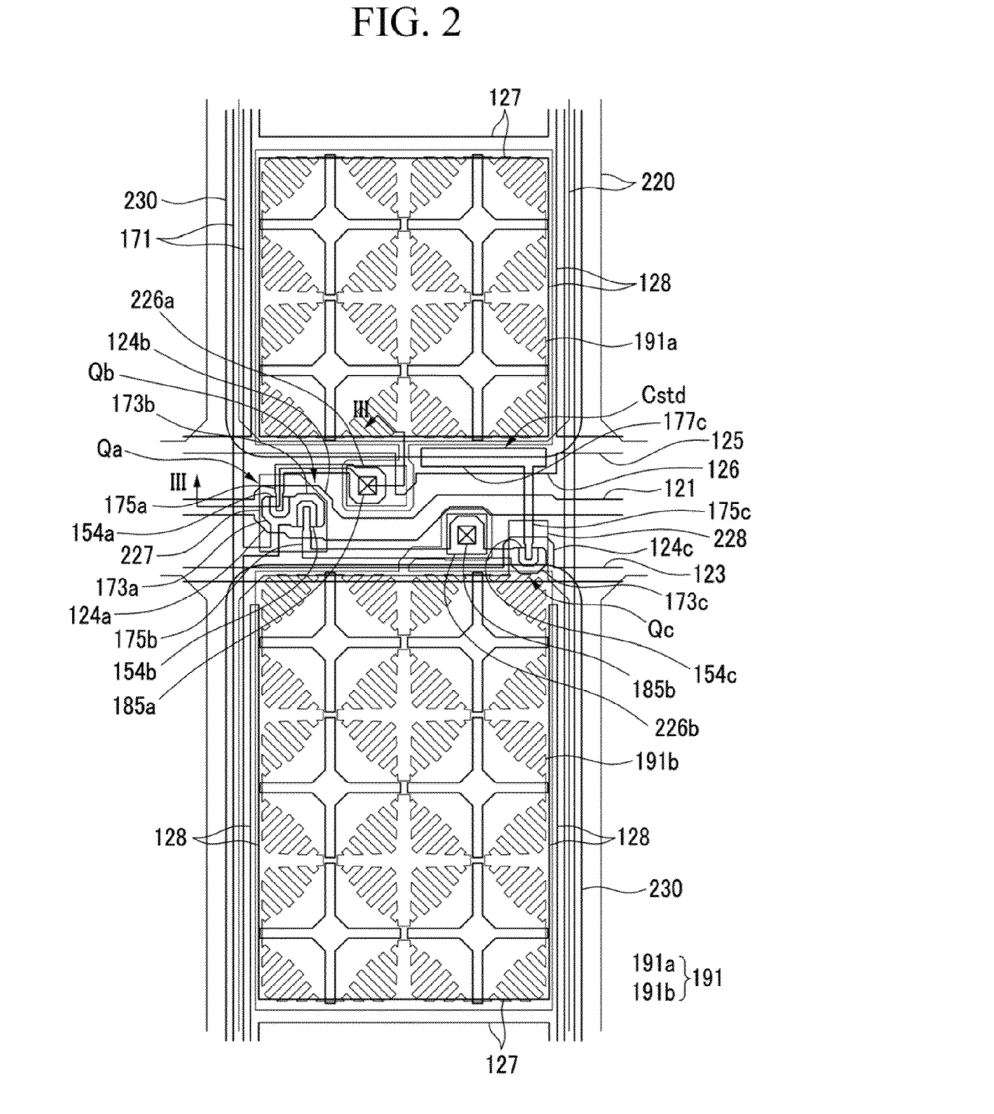
FIG. 2 is a top plan view of one pixel of the liquid crystal display according to an exemplary embodiment of the present invention.
Figure 3:
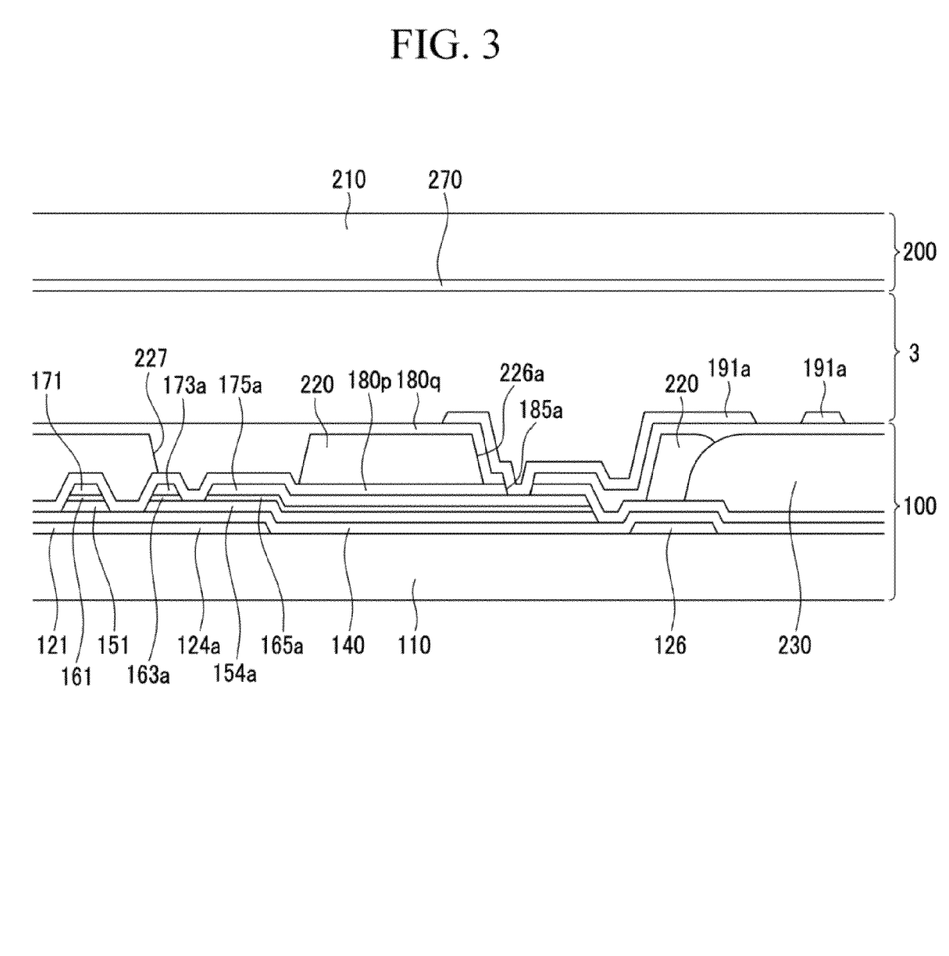
FIG. 3 is a cross-sectional view of the liquid crystal display of FIG. 2 taken along the line III-III.

FIG. 2 a top plan view of one pixel of the liquid crystal display according to an exemplary embodiment of the present invention, and FIG. 3 is a cross-sectional view of the liquid crystal display of FIG. 2 taken along the line III-III.

Referring to FIGS. 2 and 3, the liquid crystal display according to an exemplary embodiment of the present invention, which has a circuit structure that is exemplarily illustrated in FIG. 1, will now be described. Constituent elements that are substantially similar to or identical to those described above may be designated by the same reference numerals, and a description of these elements may be omitted or simplified.

The liquid crystal display includes a lower panel 100 and an upper panel 200 that face each other, and a liquid crystal layer 3 interposed between the two panels 100 and 200.

The lower display panel 100 will be described first. A plurality of gate conductors including the gate line 121, the step-down gate line 123, and a storage electrode line 125 are formed on a lower substrate 110 including a transparent insulating material such as glass.

The gate line 121 and the step-down gate line 123 extend primarily in a horizontal direction and transmit a gate signal (also referred to as "scanning signal"). The gate line 121 may include a first gate electrode 124a and a second gate electrode 124b. The step-down gate line 123 may include a third gate electrode 124c. The first and second gate electrodes 124a and 124b are connected to each other. The storage electrode line 125 may extend in the horizontal direction and may transmit a predetermined voltage such as the common voltage and the like. The storage electrode line 125 may include a storage extension portion 126, a pair of vertical portions 128 upwardly extending substantially in parallel with the data line 171, and a horizontal portion 127 that connects the pair of vertical portions 128, however, the structure of the storage electrode line 125 is not limited thereto.

A gate insulating layer 140 is positioned on the gate conductor, and a semiconductor 151 is positioned on the gate insulation layer 140. The semiconductor 151 includes a first semiconductor 154a and a second semiconductor 154b that are connected to each other while extending primarily toward the first and second gate electrodes 124a and 124b. The semiconductor 154 further includes a third semiconductor 154c connected to the second semiconductor 154b.

An ohmic contact 161 is formed on the semiconductor 151, ohmic contacts 163a and 165a are formed on the first semiconductor 154a, and ohmic contacts (not illustrated) may be respectively formed on the second and third semiconductors 154b and 154c. The ohmic contacts 163a and 165a may be omitted.

A data conductor including the data line 171, a first drain electrode 175a, a second drain electrode 175b, and a third drain electrode 175c is formed on the ohmic contacts 163a and 165a. The data line 171 may include a first source electrode 173a and a second source electrode 173b that extend toward the first and second gate electrodes 124a and 124b, respectively. Rod-shaped end portions of the first and second drain electrodes 175a and 175b are partially surrounded by the first and second source electrodes 173a and 173b, respectively. One wide end portion of the second drain electrode 175b is elongated to form a third source electrode 173c that is bent in a U-shape. A wide end portion 177c of the third drain electrode 175c overlaps the storage extension portion 126 to form the step-down capacitor Cstd, and a rod-shaped end portion thereof is partially surrounded by the third source electrode 173c.

The first gate electrode 124a, the first source electrode 173a, and the first drain electrode 175a form the first thin film transistor Qa together with the first semiconductor 154a. Similarly, the second gate electrode 124b, the second source electrode 173b, and the second drain electrode 175b form the second thin film transistor Qb together with the second semiconductor 154b. The third gate electrode 124c, the third source electrode 173c, and third drain electrode 175c form the third thin film transistor Qc together with the third semiconductor 154c.

A lower passivation layer 180p is positioned on the data conductors 171, 175a, 175b, and 175c and on exposed portions of the semiconductors 154a, 154b, and 154c. A color filter 230 and a light blocking member 220 may be positioned on the lower passivation layer 180p. The light blocking member 220 may include an opening 227 positioned on the first and second thin film transistors Qa and Qb, an opening 226a positioned on the wide end portion of the first drain electrode 175a, an opening 226b positioned on the wide end portion of the second drain electrode 175b, and an opening 228 positioned on the third thin film transistor Qc. In some exemplary embodiments, at least one of the color filter 230 and the light blocking member 220 may be positioned in the upper panel 200.

An upper passivation layer 180q is positioned on the color filter 230 and the light blocking member 220. A plurality of contact holes 185a and 185b are formed in the lower and upper passivation layers 180p and 180q to expose the first and second drain electrodes 175a and 175b, respectively.

A pixel electrode 191 including a first subpixel electrode 191a and a second subpixel electrode 191b is positioned on the upper passivation layer 180q. The pixel electrode 191 may be made of a transparent conductive material such as indium tin oxide (ITO), indium zinc oxide (IZO), etc., or a reflective metal such as aluminum, silver, chromium, or an alloy thereof. The pixel electrode 191 may be applied with the data voltage through the thin film transistors Qa and Qb that are controlled by the gate signal.

The first and second subpixel electrodes 191a and 191b may include a plurality of unit pixel electrodes (UP) that will be described later with reference to FIG. 4. For example, each first subpixel electrode 191a may include four unit pixel electrodes (UP) connected to each other, and each second subpixel electrode 191b may include six unit pixel electrodes (UP) connected to each other. The first subpixel electrode 191a may be applied with the data voltage from the first drain electrode 175a through the contact hole 185a, while the second subpixel electrode 191b may be applied with the data voltage from the first drain electrode 175a through the contact hole 185b.

Next, the upper panel 200 will be described. A common electrode 270 is positioned on an upper substrate 210 that may include a transparent insulating material such as glass. The common electrode 270 may be made of a transparent conductive material such as indium tin oxide (ITO), indium zinc oxide (IZO), etc., or a metal. The common electrode 270 positioned in each of the subpixels PXa and PXb may include a plurality of unit common electrodes (UC) that will be described later with reference to FIG. 4. For example, each common electrode 270 positioned in the first subpixel PXa may include four unit common electrodes (UC) connected to each other. Each common electrode 270 positioned in the second subpixel PXb may include six unit common electrodes (UC) connected to each other. While both the light blocking member 220 and the color filter 230 are illustrated as included in the lower panel 100, at least one of the light blocking member 220 and the color filter 230 may be positioned, for example, between the upper substrate 210 and the common electrode 270.

The first subpixel electrode 191a and the common electrode 270 form the first liquid crystal capacitor Clca together with the liquid crystal layer 3 that is interposed therebetween. The second subpixel electrode 191b and the common electrode 270 form the second liquid crystal capacitor Clcb together with the liquid crystal layer 3 that is interposed therebetween. The first and second liquid crystal capacitors Clca and Clcb maintain the applied voltage even after the first and second thin film transistors Qa and Qb are turned off. In addition, the first and second subpixel electrodes 191a and 191b may overlap the storage electrode line 125 to form the first and second storage capacitors Csta and Cstb, respectively.

According to exemplary embodiment of the present invention, the pixel electrode 191 of the pixel PX may include a plurality of unit pixel electrodes (UP) and the common electrode 270 of the pixel PX may include a plurality of unit common electrodes (UC). The number of unit pixel electrodes (UP) or unit common electrodes (UC) that are included in one pixel PX may be differently set depending on a structure or size of the pixel PX in consideration of liquid crystal control in an alignment direction of the liquid crystals (hereinafter referred to as "liquid crystal control"). In FIG. 2, even though four unit pixel electrodes (UP) and four unit common electrodes (UC) are exemplarily illustrated in each first subpixel PXa while six unit pixel electrodes (UP) and six unit common electrodes (UC) are exemplarily illustrated in each second subpixel PXb, the unit pixel electrodes (UP) and unit common electrodes (UC) are not limited to this particular configuration. For example, each second subpixel PXb may include eight unit pixel and unit common electrodes (UP) and (UC).

Figure 4:
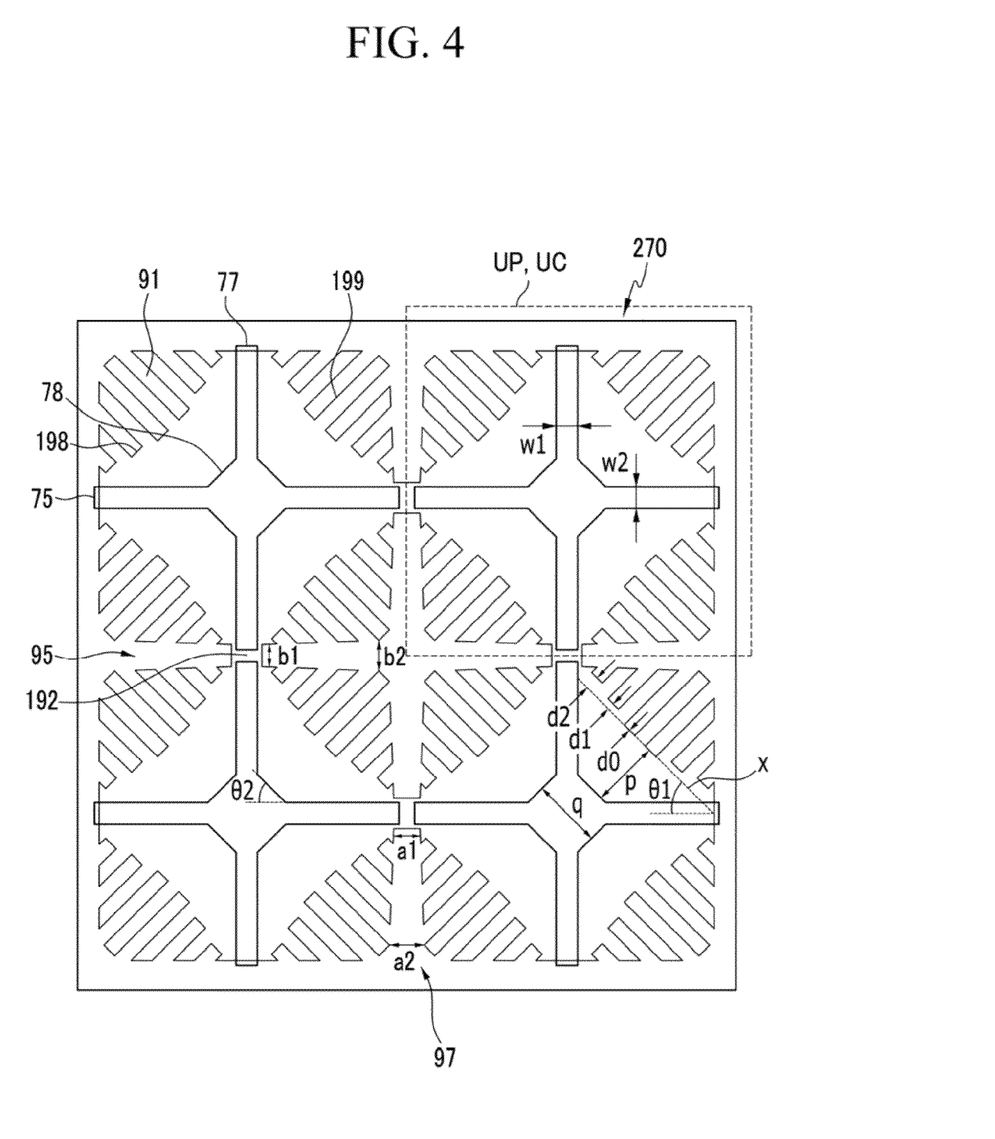
FIG. 4 is a partial top plan view of a pixel electrode and a common electrode of the liquid crystal display according to an exemplary embodiment of the present invention.
Figure 5:
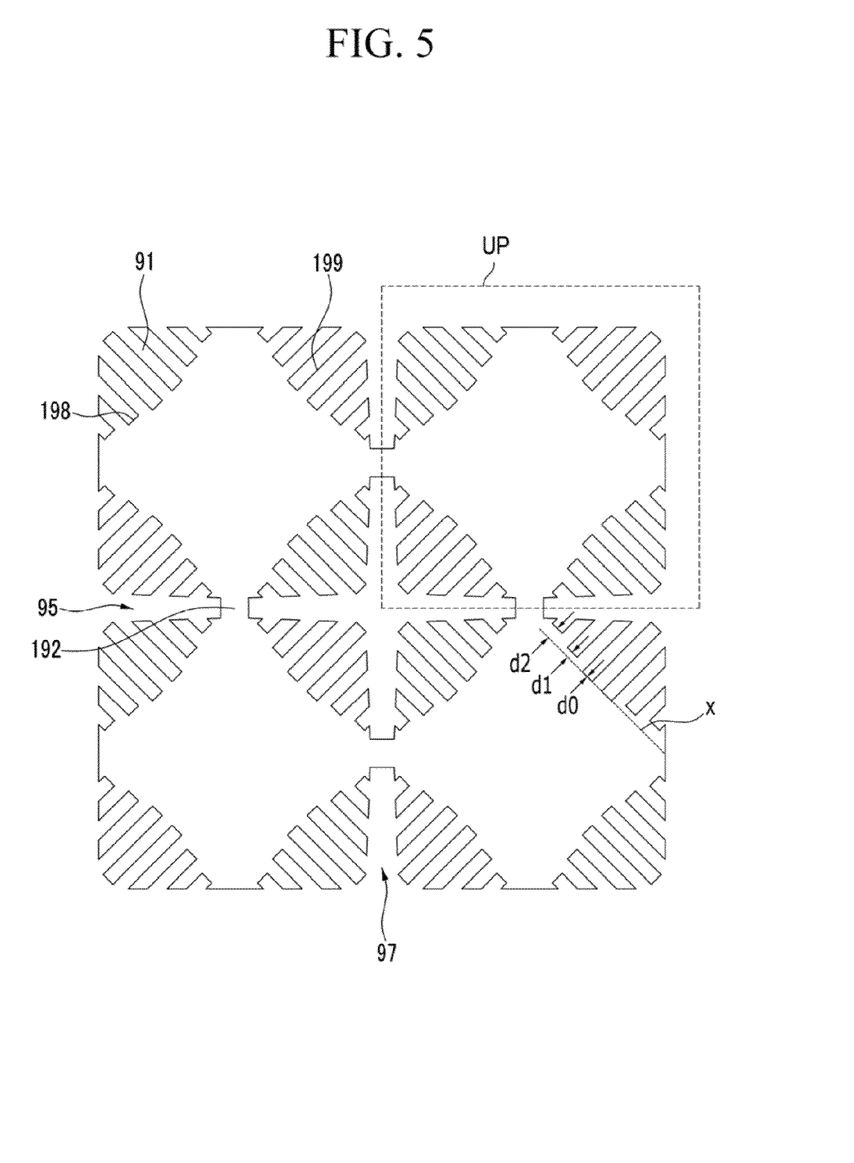
FIG. 5 is a top plan view of a pixel electrode part of FIG. 4.
Figure 6:
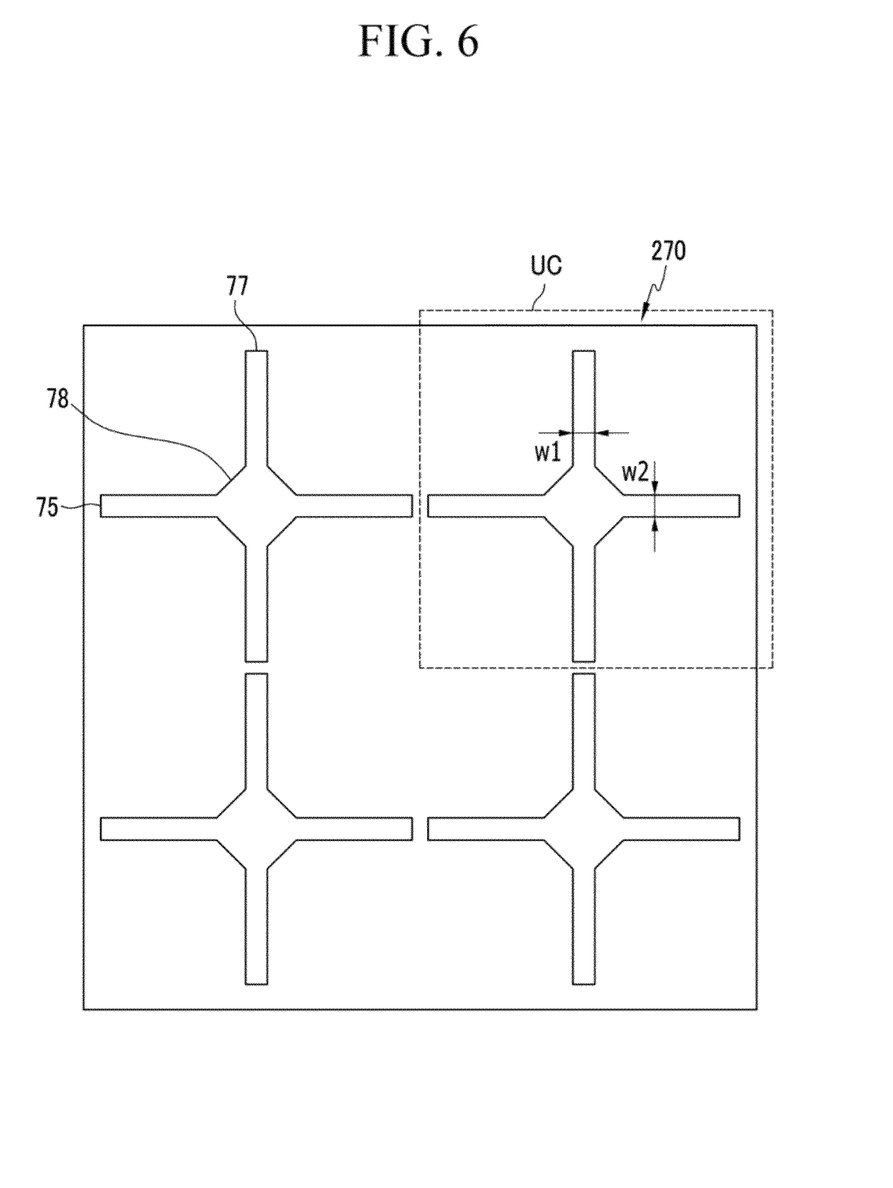
FIG. 6 is a top plan view of a common electrode part of FIG. 4.

FIG. 4 is a partial top plan view of the pixel electrode and the common electrode of the liquid crystal display according to an exemplary embodiment of the present invention. FIG. 5 is a top plan view of a pixel electrode part of FIG. 4. FIG. 6 is a top plan view of a common electrode part of FIG. 4.

The electrodes illustrated in FIGS. 4 to 6 may correspond to the first subpixel electrode 191a formed with four unit pixel electrodes (UP) and the common electrode 270 formed with four unit common electrodes (UC), examples of which are shown in FIG. 2. Further, the electrode illustrated in FIGS. 4 to 6 may partially correspond to the second subpixel electrode 191b formed with six unit pixel electrodes (UP) and the common electrode 270 formed with six unit common electrodes (UC), examples of which are shown in FIG. 2.

Referring to FIGS. 4 and 6, the pixel electrode 191 has a structure in which a plurality of unit pixel electrodes (UP) are connected, and the common electrode 270 has a structure in which a plurality of unit common electrodes (UC) are connected. The unit pixel electrode (UP) is generally shaped as a rectangle or square that is formed with a plurality of slits 91 oriented in an oblique direction. The unit common electrode (UC) is generally shaped as a rectangle or a square that is formed with cross-shaped and rhombus-shaped openings 75, 77, and 78.

Referring to FIGS. 4 and 5, the unit pixel electrode (UP) includes a rhombus-like plate portion 198, and a plurality of minute branch portions 199 extending substantially vertically from a side x (illustrated as a dotted line) of the plate portion 198. Herein, the term "rhombus-like shape" means a shape that is generally similar to an actual rhombus but with at least one side thereof that is not entirely straight. Since the plate portion 198 does not exactly have a rhombus shape but rather a shape that is deformed from an actual rhombus (e.g., a rhombus-like shape), the term "deformed side" is used to describe such a deformed shape.

The plate portion 198 has a shape that resembles a rhombus, but rather than having straight sides, at least one side is bowed, for example, one side is shaped like an arch. This at least one bowed side may be referred to herein as a deformed side. Also depicted in the figures, is a straight side that represents a straight side of an actual rhombus. This straight side is not an actual structure, but rather is offered as a reference shape for the purpose of describing the actual shape of the deformed side. In the figures, this reference shape straight side is illustrated with a dotted line and marked as X.

For example, the reference side x coincides with an edge of the plate portion 198 at its center point d0, but in regions closer to the corners of the rhombus-like shape, the edge of the plate portion 198 is increasingly further from a center of the unit pixel electrode (UP) than the reference side x. Thus, it may be said that the rhombus-like shape has a deformed edge that bows outwardly, rather than being straight. For example, the edge of the plate portion 198 may be distanced by about 1 μm further from the reference side x at a first point d1 adjacent to the center point d0 while interposing one minute branch portion 199 therebetween, and the edge of the plate portion 198 may be distanced by about 2 μm further from the reference side x at a second point d2 adjacent to the first point d1 while interposing one minute branch portion 199 therebetween. Accordingly, the plate portion 198 has a larger area as a result of the outwardly bowed deformed side than an actual rhombus shape. Since the plate portion 198 has higher transmittance than the minute branch portion 199, the transmittance also increases as the area of the plate portion 198 increases.

At two adjacent points interposing one minute branch portion 199, an increment of the edge of the plate portion 198 may be less than about 2 μm, for example, about 1 to 2 μm. When the increment is large enough to cause orientational differences of the liquid crystals between the adjacent slits 91, texture may be generated. The increment that causes the texture may be dependent upon a width of the slit 91, a thickness of the minute branch portion 199, etc.

The edge of the plate portion 198 may be gradually distanced from the reference side x as it is distanced from the center point d0 thereof. That is, the edge of the plate portion 198 may be in parallel with the reference side x at the points d1 and d2, respectively. In this case, the edge of the plate portion 198 may be perpendicular to an extending direction of the minute branch portion 199, which may facilitate the liquid crystal control.

In the rhombus-like shape of the plate portion 198, a horizontal diagonal line may form an angle θ1 of about 40 to 50 degrees with the reference side x. For example, the angle θ1 may be 45 degrees in consideration of the liquid crystal control and the transmittance. However, side visibility (e.g. viewing angle) may be increased when the horizontal diagonal line has a longer length than a vertical diagonal line.

The angle θ1 formed between the horizontal diagonal line of the plate portion 198 and the reference side x may be unique in each pixel. For example, angles θ1 of the first and second subpixels PXa and PXb may be greater than 45 degrees. In this case, the first and second subpixels PXa and PXb may be made less blurry (e.g. more sharp), thereby facilitating the liquid crystal control and increasing side visibility (e.g. viewing angle). Alternatively, the angle θ1 of the first subpixel PXa may be greater than 45 degrees, while the angle θ1 of the second subpixel PXb may be smaller than 45 degrees. In this case, the first subpixel PXa may be made less blurry (e.g. more sharp) at a low grayscale to increase its side visibility (e.g. viewing angle), while the second subpixel PXb may have an increased viewing angle.

Each unit pixel electrode (UP) is connected to the adjacent unit pixel electrode (UP) in the horizontal direction and/or the vertical direction through a connecting portion 192. The connecting portion 192 may be positioned on an extending line adjacent to the apex ("corner") of the rhombus-like shape of the plate portion 198 of the unit pixel electrode (UP). A space between the adjacent unit pixel electrodes (UP) in the vertical direction forms a horizontal gap 95, and a space between the adjacent unit pixel electrodes (UP) in the horizontal direction forms a vertical gap 97.

When the pixel electrode is formed as such, even a vicinity of the horizontal gap 95 or vertical gap 97 is affected by a fringe field that is generated by the edge of the plate portion 198 of each unit pixel electrode (UP), thereby facilitating the liquid crystal control.

The edge of the horizontal gap 95 or vertical gap 97 of the pixel electrode might not be in parallel with but rather inclined with respect to the horizontal or vertical direction, and the width of the horizontal gap 95 or vertical gap 97 might not be fixed but rather varied depending on where it is positioned. In detail, the horizontal gap 95 or vertical gap 97 may have the smallest width in a vicinity of the connecting portion 192, and may have a larger width while being further away from the connecting portion 192. Thus, the horizontal gap 95 or vertical gap 97 may have the greatest width at a center portion of the pixel electrode, that is, at a center portion where four unit pixel electrodes (UP) are collected or at corners of the unit pixel electrodes (UP). Further, the horizontal gap 95 or vertical gap 97 may have the largest width in the vicinity of edge portions of the lower electrode.

When the edge of the horizontal gap 95 or vertical gap 97 is inclined as such, the liquid crystals positioned in a region of the horizontal gap 95 or vertical gap 97 may be controlled to be inclined in a direction that is not in parallel with the horizontal direction or vertical direction. Thus, since the liquid crystals in the vicinity of the horizontal gap 95 or vertical gap 97 are inclined in a direction similar to an extending direction of the adjacent minute branch portion 199, the appearance of texture in the vicinity thereof can be reduced.

Meanwhile, the widths of the vertical and horizontal gaps 97 and 95 may be differently formed. For example, the vertical gap 97 may have a greater width than the horizontal gap 95. For example, widths a1 and a2 of the vertical gap 97 may be greater than widths b1 and b2 of the horizontal gap 95. As a non-limiting example, the width a1 may be 4 μm, the width a2 may be 7 μm, the width b1 may be 3.5 μm, and the width b2 may be 6 μm. Such an asymmetric structure may increase the fringe field that controls the liquid crystals.

A case in which the vertical gap is greater than the horizontal gap is illustrated in the drawing, but the invention is not limited to this configuration. For example, the widths b1 and b2 of the horizontal gap may be greater than the widths a1 and a2 of the vertical gap. When the vertical gap is greater than the horizontal gap, the liquid crystals are more easily controlled by bump improvement, and on the contrary, when the horizontal gap is greater than the vertical gap, the viewing angle may be increased.

At least one of four corner portions of the unit pixel electrode (UP) may have a shape that looks as if a rhombus corner has been chamfered. This shape may be referred to herein as "chamfered" however, it is to be understood, that this description is merely offered as a way of thinking about the shape, and is not offered to suggest that an act of chamfering has been performed on the shape. Referring to FIG. 5, an example in which all four corners of the unit pixel electrode UP are chamfered is illustrated. Alternatively, the center portion of the unit pixel electrode 191, for example, corner portions of each unit pixel electrode (UP) positioned at the center portion where four unit pixel electrodes (UP) are collected, might not be chamfered.

If the corner portions of the unit pixel electrode (UP) are chamfered, as the minute branch portion 199 has a shape, end portions of which are cut off, the minute branch portion 199 that would otherwise have had a relatively longer length may have a shorter length. Accordingly, an influence of the fringe field generated by the edge portion of the shortened minute branch portion 199 is delivered well to the vicinity of the horizontal gap 95 or vertical gap 97, thereby facilitating liquid crystal control.

Now referring to FIGS. 4 and 6, the unit common electrode (UC) may include the cross-shaped openings 75 and 77 that are formed in the horizontal and vertical directions, and the center opening 78 that is positioned at the center portion.

The center opening 78 may have the rhombus shape. As a non-limiting example, a distance q between two sides facing each other in the center opening 78 may be about 13 μm. An angle θ2 between the horizontal diagonal line of the rhombus of the center opening 78 and one side thereof may be about 40 to 50 degrees. An angle θ2 exceeding 50 degrees may result in low transmittance. As such, when the common electrode 270 includes the center opening 78, the vicinity of the horizontal gap 95 or vertical gap 97 is affected by a fringe field that is generated by the edge of the center opening 78, thereby facilitating the liquid crystal control.

The center opening 78 may have a shape in which either of two diagonal lines is longer than the other (an asymmetrical structure). When the center opening 78 has an asymmetrical structure as such, the liquid crystal control may be facilitated in a zero degree direction, thereby increasing the side visibility (e.g. viewing angle). The angle θ2 may be the same as the angle θ1. Thus, extending directions of the sides of the center opening 78 may be substantially perpendicular to those of the minute branch portions 199.

The cross-shaped openings 75 and 77 include the horizontal opening 75 and the vertical opening 77. The widths of the horizontal and vertical openings 75 and 77 may be the same, but a width w1 of the vertical opening 77 may be greater than a width w2 of the horizontal opening 75. For example, the vertical opening 77 may have a width of 4 μm while the horizontal opening 75 may have a width of 3.5 μm, but the present invention is not limited to this configuration. The fringe field, by which the liquid crystals are controlled in the zero degree direction, is increased in its intensity by the cross-shaped openings 75 and 77, thereby increasing the side visibility (e.g. viewing angle).

As described above, by forming the cross-shaped openings 75 and 77 facing the diagonal lines of the rhombus-like shape of the plate portion 198 of the pixel electrode 191 in the common electrode 270, the liquid crystal control may be enhanced. For example, the liquid crystals may be inclined substantially in parallel with the minute branch portion 199. Particularly, the liquid crystal control that is sufficient for the liquid crystals to be pretilted, and thus to have a quick response speed, may be obtained, even without forming a conventional alignment aid in an alignment layer or the liquid crystal layer.

The unit common electrodes (UC) may be connected to each other. For example, the cross-shaped openings 75 and 77 of the adjacent unit common electrodes (UC) that face each other in the horizontal or vertical direction may be connected to each other. In this case, in order for the unit common electrodes (UC) of one common electrode 270 to be divided into a plurality of pieces, end portions of the cross-shaped openings 75 and 77 in the vicinity of the edges of the unit common electrode (UC) may be spaced apart from the edges of the unit common electrode (UC). For example, four sub-regions that are divided by the cross-shaped openings 75 and 77 in each unit common electrode (UC) may be connected to each other.

Distances between the openings 75, 77, and 78 and the edges of the plate portion 198 of the unit pixel electrode (UP) may be limited in consideration of liquid crystal control. Since a distance p between one side of the center opening 78 of the unit common electrode (UC) and the reference side x of the plate portion 198 of the unit pixel electrode (UP) is greatest, the distance p may generally determine a size of the plate portion 198. As a non-limiting example, in the case of 40-inch full high-definition (FHD) pixels, the distance p may be about 19 μm. Since the plate portion 198 of the unit pixel electrode (UP) has the rhombus shape, the distance p between the side of the plate portion 198 and the openings 75 and 77 becomes closer when moving closer toward the apexes (corners of the rhombus). Thus, as shown in the exemplary embodiment of the present invention, even if the size of the plate portion 198 is gradually increased when coming closer toward the apexes of the true rhombus, the liquid crystal control may still be sufficient and thus the transmittance may be increased due to an increased area of the plate portion.

The present invention is not limited to a combination of the aforementioned exemplary embodiments, and any combination thereof satisfying characteristics that a display device needs may also be possible. In FIGS. 4 to 6, the center opening 78 of the unit common electrode (UC) and the plate portion 198 of the unit pixel electrode (UP) are illustrated to correspond to each other, but the invention is not limited to this configuration. In addition, the first and second subpixels may have a symmetrical or asymmetrical structure, or one of them may have the asymmetrical structure while the other has a symmetrical structure.

FIGS. 7 to 10 are simulated images of the pixel of the liquid crystal display and alignment of liquid crystal molecules in accordance with exemplary embodiments of the present invention.

FIGS. 7 to 10 are simulated images showing transmittance characteristics of the edge of the plate portion of the unit pixel electrode (UP) while it is deformed according to exemplary embodiments of the present invention. Illustrated therein is a pixel area corresponding to about a quarter of the unit pixel and unit common electrodes (UP) and (UC). In each drawing, the simulation image is shown at the left side, and directions toward which the liquid crystals are inclined are shown at the right side in addition to the simulated image. For example, in a right drawing, the liquid crystals are inclined toward white colored parts in a plurality of bars that display two colors.

Figure 7:
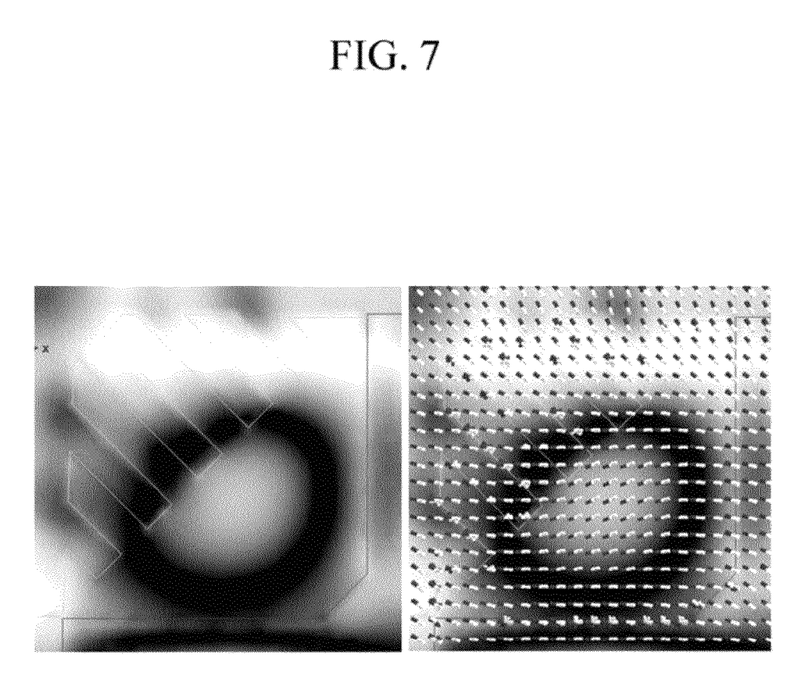
FIGS. 7 to 10 are simulated images showing a pixel of the liquid crystal display and alignment of liquid crystal molecules in accordance with exemplary embodiments of the present invention.
Figure 8:
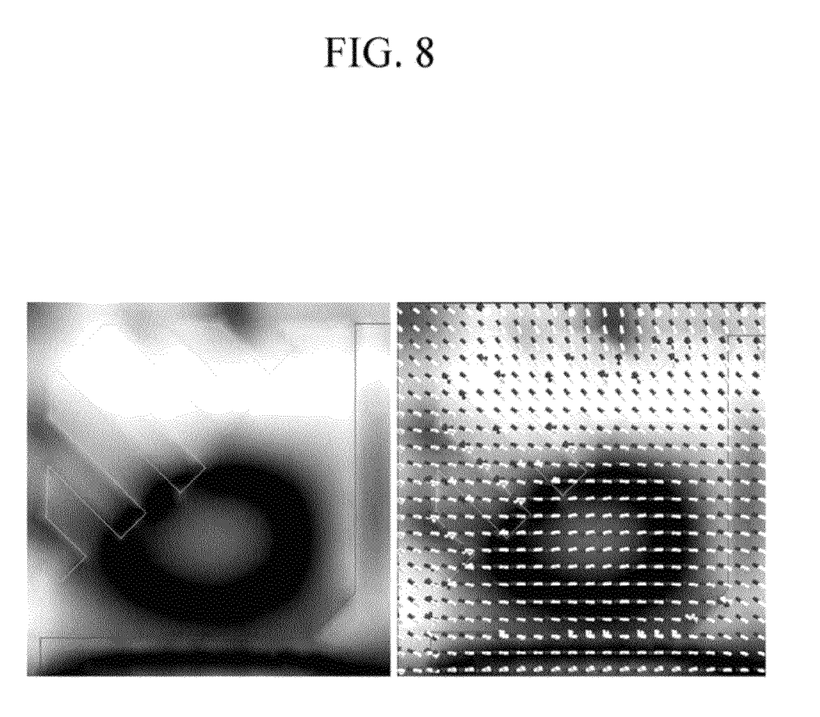
Figure 9:
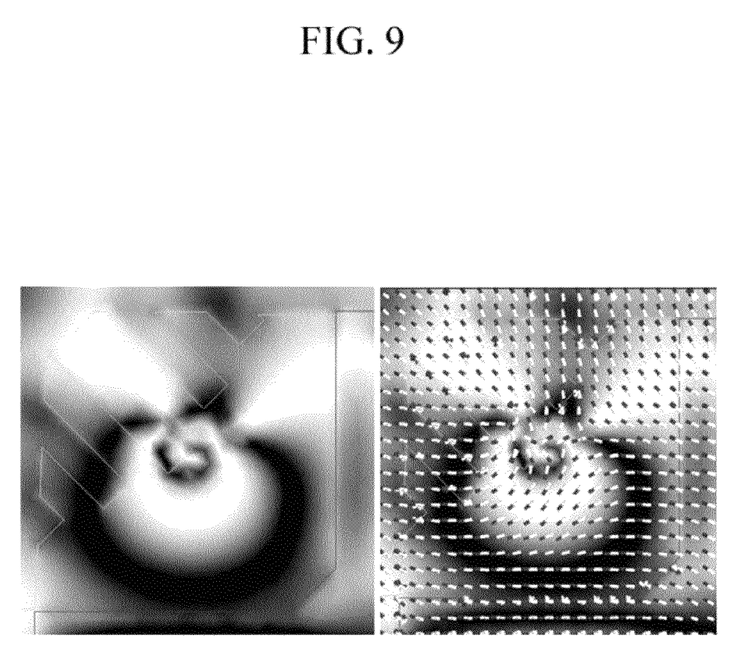
Figure 10:
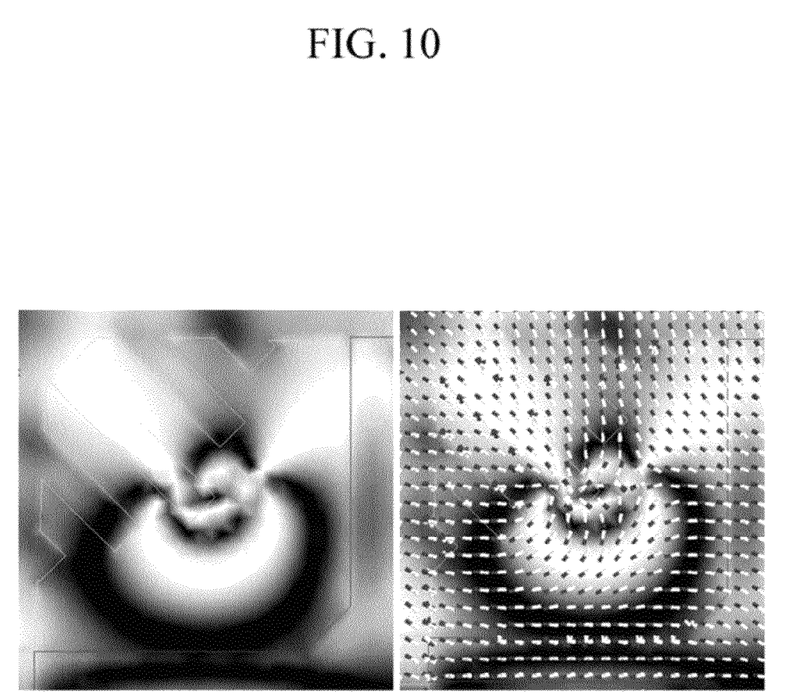

FIG. 7 illustrates an example in which the plate portion 198 of the unit pixel electrode (UP) is exactly in the shape of a rhombus. Here, the rhombus shape is limited by the reference side x in FIG. 4. FIGS. 8 to 10 shows an example in which the edge of the plate portion 198 of the unit pixel electrode (UP) is increased stepwise by 1 μm, 2 μm, and 3 μm, respectively, from the reference side x while interposing the minute branch portion 199 therebetween. Cross-referring to FIG. 4, it can be seen that FIG. 8 show a case of d2−d1=d1−d0=1 μm, FIG. 9 shows a case of d2−d1=d1−d0=2 μm, and FIG. 9 shows a case of d2−d1=d1−d0=3 μm.

The simulation result shows that transmittance in 40-inch full high-definition (FHD) pixels has increased further by about 0.5 to 0.8% in the case of FIG. 8 in which the edge of the plate portion 198 is increased stepwise by 1 μm than the case of FIG. 7 in which the plate portion 198 is exactly in the shape of the rhombus. In the two exemplary geometries, overall inclined directions of the liquid crystals may be similar to each other.

The cases of FIGS. 9 and 10 in which the edge of the plate portions 198 is increased stepwise by 2 μm and 3 μm, respectively, the transmittance has further increased because the area of the plate portion 198 is further increased. However, it can be seen that a texturing is recognized in the exemplary embodiment of FIG. 9, and the texture becomes severe in the exemplary embodiment of FIG. 10. This texturing may be caused by the increment of the edge of the plate portion 198 exceeding a predetermined level and the corresponding region acting as a notch and thus the liquid crystals are inclined toward a direction of the notch.

While this invention has been described in connection with exemplary embodiments thereof, it is to be understood that the invention is not limited to the disclosed embodiments, but, on the contrary, is intended to cover various modifications and equivalent arrangements.

What is claimed is:

1. A liquid crystal display comprising:
   a lower panel including a pixel electrode including at least one unit pixel electrode;
   an upper panel including a common electrode; and
   a liquid crystal layer interposed between the lower panel and the upper panel,
   wherein the unit pixel electrode includes a rhombus-like plate portion, and a plurality of minute branch portions extending therefrom.

2. The display of claim 1, wherein the rhombus-like plate portion includes at least one side that is outwardly bowed.

3. The display of claim 2, wherein the at least one outwardly bowed side has an approximate center that coincides with an approximate center of a reference side that corresponds to the outwardly bowed side, wherein the reference side is an imaginary line depicting a side of a true rhombus.

4. The display of claim 3, wherein the at least one outwardly bowed side is closest to the reference side at the centers thereof and is farther from the reference side at the ends thereof.

5. The display of claim 4, wherein the minute branch portions extend from an edge of the plate portion in a direction approximately perpendicular thereto.

6. The display of claim 5, wherein one point of the at least one edge of the plate portion is distanced by about 2 μm or less from another point adjacent thereto and one minute branch portion of the plurality of minute branch portions is disposed between the one point and the other point.

7. The display of claim 6, wherein the one point of the at least one edge of the plate portion is distanced by about 1 to 2 μm from the adjacent other point.

8. The display of claim 1, wherein the common electrode includes a domain dividing element corresponding to the unit pixel electrode.

9. The display of claim 8, wherein the domain dividing element has a cross-shaped opening.

10. The display of claim 8, wherein the domain dividing element has a rhombus-shaped opening.

11. The display of claim 10, wherein the domain dividing element has an opening that is shaped like a cross superimposed with a rhombus.

12. The display of claim 9, wherein a center of the cross-shaped opening coincides with that of the plate portion.

13. The display of claim 10, wherein the rhombus-shaped opening is smaller than the plate portion.

14. The display of claim 10, wherein each side of the rhombus-shaped opening is parallel to an adjacent edge of the plate portion.

15. The display of claim 10, wherein at least one side of the rhombus-shaped opening is distanced by about 19 μm or more from an adjacent edge of the plate portion.

16. The display of claim 1, wherein each pixel electrode includes a first subpixel electrode and a second subpixel electrode, and the first and second subpixel electrodes respectively include the plurality of unit pixel electrodes.

17. The display of claim 16, wherein each first subpixel electrode includes four of the unit pixel electrodes that are connected to each other, and each second subpixel electrode includes six of the unit pixel electrodes that are connected to each other.

18. A liquid crystal display device, comprising:
   a common electrode;
   a pixel electrode divided into a plurality of unit pixels, the pixel electrode and the common electrode generating an electric field therebetween; and
   a liquid crystal layer disposed within the influence of the electric field, wherein each of the plurality of unit pixels includes a plate portion and a plurality of branch portions extending from the plate portion, and wherein the plate portion has a rhombus-like shape with at least one outwardly bowed side.

19. The liquid crystal display device of claim 18, wherein the at least one outwardly bowed side has an approximate center that coincides with an approximate center of a reference side that corresponds to the outwardly bowed side, wherein the reference side is not an actual element but rather a line depicting a side of a true rhombus.

20. The liquid crystal display device of claim 19, wherein the at least one outwardly bowed side is closest to the reference side at the centers thereof and is farther from the reference side at the ends thereof.

* * * * *